(12) United States Patent
Himmelmann (10) Patent No.: US 10,393,225 B2
(45) Date of Patent: Aug. 27, 2019

(54) INTEGRATED MULTI-FUNCTION PROPULSION BELT FOR AIR CUSHION SUPPORTED AIRCRAFT CARGO LOADING ROBOT

(71) Applicant: GOODRICH CORPORATION, Charlotte, NC (US)

(72) Inventor: Richard A. Himmelmann, Beloit, WI (US)

(73) Assignee: GOODRICH CORPORATION, Charlotte, NC (US)

( * ) Notice: Subject to any disclaimer, the term of this patent is extended or adjusted under 35 U.S.C. 154(b) by 12 days.

(21) Appl. No.: 14/589,742

(22) Filed: Jan. 5, 2015

(65) Prior Publication Data

US 2016/0194081 A1    Jul. 7, 2016

(51) Int. Cl.
*F16G 1/18*    (2006.01)
*B64D 9/00*    (2006.01)
(Continued)

(52) U.S. Cl.
CPC .................. *F16G 1/18* (2013.01); *B64C 1/20* (2013.01); *B64D 9/00* (2013.01); *B65G 15/36* (2013.01);
(Continued)

(58) Field of Classification Search
CPC .......... B64C 1/20; B65G 15/36; B65G 15/30; B65G 25/06; H01L 39/003; H01L 31/02; H01L 31/026; H01L 35/102; H01L 35/104; H01L 35/105; H01L 35/108; H01L 39/005; H01L 39/006; B64D 9/00; B64D 2009/006; F16G 1/18; H01B 3/445; H01B 11/02; H01B 1/02; H01B 1/026; H01B 7/08; H01B 7/0823; H01B 7/0869; H01B 9/003; H01B 5/102; H01B 5/104; H01B 5/105; H01B 5/108; H01B 9/005; H01B 9/006; H01B 11/005; H01B 11/203; H01B 11/206; H01B 11/22; B60P 1/36; B60P 1/365;
(Continued)

(56) References Cited

U.S. PATENT DOCUMENTS 1,437,964 A   12/1922  Fitch
2,918,183 A   12/1959  Petersen
(Continued)

FOREIGN PATENT DOCUMENTS

AU    442872    11/1973
BE    723545    4/1969
(Continued)

OTHER PUBLICATIONS

Preinterview First Office Action dated Sep. 4, 2015 in U.S. Appl. No. 14/512,000.
(Continued)

*Primary Examiner* — Glenn F Myers
(74) *Attorney, Agent, or Firm* — Snell & Wilmer, L.L.P.

(57) ABSTRACT

In accordance with various embodiments, a multifunction belt is disclosed. The multifunction belt includes a plurality of cables. The plurality of cables includes at least one tension supporting cable configured to resist tension and a first signal conducting cable configured to conduct electricity. The multifunction belt also includes a coating applied to the plurality of cables.

17 Claims, 4 Drawing Sheets

(51) Int. Cl.
  *H01B 1/02* (2006.01)
  *H01B 3/44* (2006.01)
  *B64C 1/20* (2006.01)
  *B65G 15/36* (2006.01)
  *F16G 1/00* (2006.01)

(52) U.S. Cl.
  CPC ................ *F16G 1/00* (2013.01); *H01B 1/02* (2013.01); *H01B 3/445* (2013.01); *B64D 2009/006* (2013.01)

(58) Field of Classification Search
  CPC ....... B60P 1/38; G02B 6/4404; G02B 6/4403; G02B 6/4416; G02B 6/448; G02B 6/4434
  See application file for complete search history.

(56) References Cited

U.S. PATENT DOCUMENTS

| | | | |
|---|---|---|---|
| 3,055,446 A | 9/1962 | Vaughen | |
| 3,081,886 A | 3/1963 | Flexman et al. | |
| 3,190,460 A | 6/1965 | Rubin | |
| 3,209,929 A | 10/1965 | Petersen et al. | |
| 3,513,934 A | 5/1970 | Crowley | |
| 3,561,623 A | 2/1971 | McCaul | |
| 3,595,407 A | 7/1971 | Muller-Kuhn | |
| 3,597,117 A | 8/1971 | Zoehfeld | |
| 3,671,069 A | 6/1972 | Martin | |
| 3,727,715 A | 4/1973 | Barthalon | |
| 3,756,342 A | 9/1973 | Burdick | |
| 3,756,544 A | 9/1973 | Bader | |
| 3,773,391 A | 11/1973 | Crandall et al. | |
| 3,776,492 A | 12/1973 | Iben | |
| 3,780,823 A | 12/1973 | Michaud | |
| 3,796,279 A | 3/1974 | Burdick | |
| 3,797,398 A | 3/1974 | Bliss | |
| 3,807,035 A | 4/1974 | Moorman | |
| 3,809,268 A | 5/1974 | Lutz | |
| 3,869,028 A | 3/1975 | Sawada | |
| 3,899,092 A | 4/1975 | Nordstrom | |
| 3,908,785 A | 9/1975 | Vaughen | |
| 3,986,605 A | 10/1976 | Dooley et al. | |
| 4,131,320 A | 12/1978 | Volat et al. | |
| 4,139,071 A | 2/1979 | Tackett | |
| 4,155,421 A | 5/1979 | Johnson | |
| 4,216,927 A | 8/1980 | Byrd | |
| 4,304,521 A | 12/1981 | Hammond | |
| 4,347,791 A | 9/1982 | Mandros | |
| 4,353,457 A | 10/1982 | Haley | |
| 4,354,796 A | 10/1982 | Bergman | |
| 4,441,571 A | 4/1984 | Wood | |
| 4,544,319 A | 10/1985 | Foiling et al. | |
| 4,567,957 A | 2/1986 | Johnson | |
| 4,600,169 A | 7/1986 | Koster et al. | |
| 4,618,292 A | 10/1986 | Judge et al. | |
| 4,621,727 A * | 11/1986 | Strader | B65G 43/02 198/810.02 |
| 4,658,951 A | 4/1987 | Saunders | |
| 4,676,699 A | 6/1987 | Leonov | |
| 4,804,077 A | 2/1989 | John, Jr. | |
| 4,815,926 A | 3/1989 | Chaffee et al. | |
| 4,878,635 A | 11/1989 | Nordstrom | |
| 4,951,770 A | 8/1990 | Vaughen | |
| 4,984,756 A | 1/1991 | Anders | |
| 5,120,184 A | 6/1992 | Gerawan | |
| 5,137,367 A | 8/1992 | Madonia et al. | |
| 5,162,611 A * | 11/1992 | Nichols, III | H01B 7/0823 174/115 |
| 5,184,366 A | 2/1993 | Rawdon | |
| 5,207,115 A | 5/1993 | Takei | |
| 5,226,773 A | 7/1993 | Morito | |
| 5,311,973 A | 5/1994 | Tseng et al. | |
| 5,350,270 A | 9/1994 | Stallard et al. | |
| 5,456,556 A | 10/1995 | Petrovic | |
| 5,467,827 A | 11/1995 | McLoughlin | |
| 5,515,982 A | 5/1996 | Hasegawa | |
| 3,282,359 A | 11/1996 | Satterfield, Jr. | |
| 5,634,636 A | 6/1997 | Jackson et al. | |
| 5,690,567 A | 11/1997 | DeNijs et al. | |
| 5,779,296 A | 7/1998 | Hewko | |
| 5,850,906 A | 12/1998 | Dean | |
| 5,893,450 A | 4/1999 | Metivier | |
| 6,193,043 B1 | 2/2001 | Langston | |
| 6,196,788 B1 | 3/2001 | Talbot et al. | |
| 6,296,588 B1 * | 10/2001 | Ciemniecki | B29D 29/08 474/268 |
| 6,310,286 B1 * | 10/2001 | Troxel | H01B 9/003 174/102 R |
| 6,427,947 B1 | 8/2002 | Rohrlick et al. | |
| 6,495,761 B1 * | 12/2002 | Hacker | H01B 9/003 174/113 R |
| 6,517,028 B2 | 2/2003 | Huber | |
| 6,630,633 B1 | 10/2003 | Uber et al. | |
| 6,640,963 B2 | 11/2003 | Lecrivain | |
| 6,923,606 B2 | 8/2005 | Fehrle | |
| 7,073,994 B2 | 7/2006 | Huber et al. | |
| 7,108,474 B2 | 9/2006 | Moriya et al. | |
| 7,210,280 B2 | 5/2007 | Cottone | |
| 7,274,289 B2 * | 9/2007 | Kerr | G08B 13/126 340/500 |
| 7,393,159 B2 | 7/2008 | Chang et al. | |
| 7,426,974 B1 | 9/2008 | Yeghiayan | |
| 7,494,004 B2 | 2/2009 | Stolyar et al. | |
| 7,513,716 B2 | 4/2009 | Hayashi et al. | |
| 7,643,133 B2 | 1/2010 | Milender | |
| 7,695,235 B2 | 4/2010 | Rallis | |
| 7,785,056 B2 | 8/2010 | Sanford et al. | |
| 7,800,009 B2 | 9/2010 | Gochar, Jr. | |
| 7,845,898 B2 | 12/2010 | Rawdon et al. | |
| 7,886,920 B2 | 2/2011 | Colley | |
| 7,913,950 B2 | 3/2011 | Huber | |
| 8,056,701 B2 | 11/2011 | Sugimoto | |
| 8,162,571 B2 | 4/2012 | Wada et al. | |
| 8,356,966 B2 | 1/2013 | Voorhees | |
| 8,376,124 B1 | 2/2013 | Rosen | |
| 8,499,922 B2 | 8/2013 | Hoshi | |
| 8,602,204 B2 | 12/2013 | Yang et al. | |
| 8,960,607 B2 | 2/2015 | Dorris, III | |
| 9,156,553 B1 | 10/2015 | Johnson | |
| 9,205,923 B1 | 12/2015 | Himmelmann | |
| 9,284,130 B1 | 3/2016 | Himmelmann | |
| 9,290,270 B2 | 3/2016 | Himmelmann | |
| 9,352,835 B2 | 5/2016 | Himmelmann | |
| 9,387,931 B2 | 7/2016 | Himmelmann | |
| 9,452,901 B2 | 9/2016 | Panzram | |
| 9,511,860 B2 | 12/2016 | Himmelmann | |
| 9,511,861 B2 | 12/2016 | Himmelmann | |
| 9,555,888 B2 | 1/2017 | Himmelmann | |
| 9,567,166 B2 | 2/2017 | Himmelmann | |
| 9,764,840 B2 | 9/2017 | Himmelmann | |
| 9,776,720 B2 | 10/2017 | Himmelmann | |
| 9,783,298 B2 | 10/2017 | Himmelmann | |
| 9,783,299 B2 | 10/2017 | Himmelmann | |
| 9,784,276 B2 | 10/2017 | Himmelmann | |
| 9,937,997 B2 | 4/2018 | Himmelmann | |
| 2002/0164236 A1 | 11/2002 | Fukuhara | |
| 2003/0121726 A1 | 7/2003 | Berends | |
| 2004/0241267 A1 | 12/2004 | Schultz | |
| 2004/0245397 A1 | 12/2004 | Garcia | |
| 2005/0063809 A1 | 3/2005 | Walker | |
| 2006/0096395 A1 | 5/2006 | Weiss | |
| 2007/0007391 A1 | 1/2007 | McCoskey | |
| 2007/0023259 A1 | 2/2007 | Schonauer | |
| 2007/0025832 A1 | 2/2007 | Rawdon et al. | |
| 2007/0074891 A1 * | 4/2007 | Burke | H01B 7/06 174/113 R |
| 2007/0125908 A1 | 6/2007 | Elchholz | |
| 2008/0011119 A1 | 1/2008 | Bartosch | |
| 2008/0257692 A1 | 10/2008 | Wallace | |
| 2008/0267751 A1 | 10/2008 | Safir | |
| 2009/0252568 A1 | 10/2009 | Morin | |
| 2009/0304482 A1 | 12/2009 | Sanford | |
| 2010/0000459 A1 | 1/2010 | Colangelo | |
| 2010/0006401 A1 | 1/2010 | Flury | |

(56) References Cited

U.S. PATENT DOCUMENTS

| | | | |
|---|---|---|---|
| 2010/0212982 A1 | 8/2010 | Lin | |
| 2011/0079427 A1 | 4/2011 | Powale | |
| 2011/0215198 A1 | 9/2011 | Panzram et al. | |
| 2011/0240805 A1 | 10/2011 | Komiya | |
| 2011/0273313 A1 | 11/2011 | Hettwer | |
| 2012/0014757 A1 | 1/2012 | Muller | |
| 2012/0138434 A1* | 6/2012 | Trieb | B29D 29/06 198/847 |
| 2012/0170227 A1 | 7/2012 | Bayliss | |
| 2012/0262849 A1 | 10/2012 | Prax | |
| 2013/0011230 A1 | 1/2013 | Barry | |
| 2013/0075065 A1 | 3/2013 | Degner et al. | |
| 2013/0287505 A1 | 10/2013 | Seibt | |
| 2013/0313073 A1 | 11/2013 | Huber | |
| 2014/0060886 A1* | 3/2014 | Siahaan | H01B 7/0823 174/117 F |
| 2014/0097296 A1 | 4/2014 | Sankrithi | |
| 2014/0338557 A1 | 11/2014 | Zhou | |
| 2014/0367515 A1 | 12/2014 | Lohmann | |
| 2014/0373747 A1 | 12/2014 | Yagci | |
| 2014/0377017 A1 | 12/2014 | Panzram | |
| 2015/0158404 A1 | 6/2015 | Pylypenko | |
| 2015/0225082 A1 | 8/2015 | Levron | |
| 2015/0235742 A1* | 8/2015 | Fu | H01B 11/22 385/101 |
| 2015/0298808 A1 | 10/2015 | Huber | |
| 2015/0310964 A1* | 10/2015 | Larson | G02B 6/441 174/71 R |
| 2016/0052630 A1 | 2/2016 | Himmelmann | |
| 2016/0101857 A1 | 4/2016 | Himmelmann et al. | |
| 2016/0101858 A1 | 4/2016 | Himmelmann | |
| 2016/0101859 A1 | 4/2016 | Himmelmann | |
| 2016/0101860 A1 | 4/2016 | Himmelmann | |
| 2016/0101861 A1 | 4/2016 | Himmelmann | |
| 2016/0101862 A1 | 4/2016 | Himmelmann | |
| 2016/0101863 A1 | 4/2016 | Himmelmann | |
| 2016/0101947 A1 | 4/2016 | Himmelmann | |
| 2016/0194081 A1 | 7/2016 | Himmelmann | |
| 2016/0194082 A1 | 7/2016 | Himmelmann | |
| 2016/0194083 A1 | 7/2016 | Himmelmann | |
| 2016/0221763 A1 | 8/2016 | Himmelmann | |
| 2017/0036763 A1 | 2/2017 | Himmelmann | |
| 2017/0043874 A1 | 2/2017 | Himmelmann | |
| 2017/0101994 A1 | 4/2017 | Himmelmann | |
| 2017/0106966 A1 | 4/2017 | Himmelmann | |
| 2017/0361931 A1 | 12/2017 | Himmelmann | |

FOREIGN PATENT DOCUMENTS

| | | | |
|---|---|---|---|
| CA | 903562 | | 6/1972 |
| CN | 86104961 | | 2/1987 |
| CN | 102235550 | | 11/2011 |
| CN | 203746480 | | 7/2014 |
| CN | 204117643 U | * | 1/2015 |
| DE | 3440933 | | 10/1985 |
| DE | 102008040751 | | 1/2010 |
| DE | 102010035099 | | 2/2012 |
| EP | 0377692 | | 7/1990 |
| EP | 1547893 | | 6/2005 |
| EP | 2261511 | | 12/2010 |
| EP | 2815970 | | 12/2014 |
| FR | 1360952 | | 5/1964 |
| FR | 2340636 | | 9/1977 |
| FR | 2448454 | | 9/1980 |
| GB | 1210244 | | 10/1970 |
| GB | 1353585 | | 5/1974 |
| GB | 2182015 | | 5/1987 |
| JP | 2000128322 | | 5/2000 |
| JP | 2013120641 A | * | 6/2013 |
| WO | 8706909 | | 11/1987 |
| WO | 8801975 | | 3/1988 |
| WO | 9819940 | | 5/1998 |
| WO | 0066463 | | 11/2000 |
| WO | 2004031590 | | 4/2004 |
| WO | 2005028248 | | 3/2005 |
| WO | 2005039036 | | 4/2005 |
| WO | 2008091287 | | 7/2008 |
| WO | 2014049590 | | 4/2014 |

OTHER PUBLICATIONS

Notice of Allowance dated Oct. 19, 2015 in U.S. Appl. No. 14/512,000.
Notice of Allowance dated Nov. 13, 2015 in U.S. Appl. No. 14/464,323.
Office Action dated Nov. 17, 2015 in U.S. Appl. No. 14/511,559.
Corrected Notice of Allowability dated Jan. 7, 2016 in U.S. Appl. No. 14/464,323.
Preinterview First Office Action dated Jan. 7, 2016 in U.S. Appl. No. 14/512,113.
Notice of Allowance dated Jan. 20, 2016 in U.S. Appl. No. 14/511,553.
Partial European Search Report dated Mar. 18, 2016 in European Application No. 15189110.8.
Notice of Allowance dated Apr. 1, 2016 in U.S. Appl. No. 14/511,645.
Final Office Action dated Apr. 22, 2016 in U.S. Appl. No. 14/511,559.
Supplemental Notice of Allowability dated May 3, 2016 in U.S. Appl. No. 14/512,113.
Supplemental Notice of Allowability dated Jun. 3, 2016 in U.S. Appl. No. 14/512,113.
Extended European Search Report dated Jun. 22, 2016 in European Application No. 16153483.9.
Preinterview First Office Action dated Jun. 30, 2016 in U.S. Appl. No. 14/512,056.
Extended European Search Report dated Jul. 11, 2016 in European Application No. 16150150.7.
Preinterview First Office Action dated Sep. 8, 2016 in U.S. Appl. No. 14/512,056.
Extended European Search Report dated Jul. 4, 2016 in European Application No. 15189110.8.
Notice of Allowance dated Oct. 4, 2016 in U.S. Appl. No. 14/512,127.
Notice of Allowance dated Oct. 7, 2016 in U.S. Appl. No. 14/512,118.
Notice of Allowance dated Oct. 11, 2016 in U.S. Appl. No. 14/512,011.
Notice of Allowance dated Oct. 11, 2016 in U.S. Appl. No. 14/512,066.
Preinterview First Office Action dated Oct. 25, 2016 in U.S. Appl. No. 14/610,391.
Office Action dated Oct. 26, 2016 in U.S. Appl. No. 14/511,559.
Corrected Notice of Allowability dated Oct. 27, 2016 in U.S. Appl. No. 14/512,118.
Corrected Notice of Allowability dated Oct. 27, 2016 in U.S. Appl. No. 14/512,127.
Corrected Notice of Allowability dated Nov. 1, 2016 in U.S. Appl. No. 14/512,011.
Extended European Search Report dated Feb. 9, 2016 in European Application No. 15181603.0.
Extended European Search Report dated Feb. 11, 2016 in European Application No. 15189145.4.
Extended European Search Report dated Feb. 18, 2016 in European Application No. 15189116.5.
Extended European Search Report dated Feb. 18, 2016 in European Application No. 15189127.2.
Extended European Search Report dated Feb. 19, 2016 in European Application No. 15189129.8.
Extended European Search Report dated Mar. 7, 2016 in European Application No. 15189114.0.
Extended European Search Report dated Mar. 11, 2016 in European Application No. 15189140.5.
Extended European Search Report dated Mar. 11, 2016 in European Application No. 15189107.4.
Extended European Search Report dated Mar. 11, 2016 in European Application No. 15189119.9.
Extended European Search Report dated Mar. 14, 2016 in European Application No. 15189121.5.
Extended European Search Report dated Mar. 16, 2016 in European Application No. 15189124.9.

(56) References Cited

OTHER PUBLICATIONS

Notice of Allowance dated Mar. 24, 2016 in U.S. Appl. No. 14/512,113.
U.S. Appl. No. 15/373,536, filed Dec. 9, 2016 and entitled Pressure Compensating Air Curtain for Air Cushion Supported Cargo Loading Platform.
Corrected Notice of Allowability dated Dec. 15, 2016 in U.S. Appl. No. 14/512,127.
Officce Action dated Dec. 15, 2016 in U.S. Appl. No. 14/511,902.
Notice of Allowance dated Dec. 21, 2016 in U.S. Appl. No. 14/610,391.
U.S. Appl. No. 15/393,423, filed Dec. 29, 2016 and entitled Compact Centrifgual Air Blowers for Air Cushion Supported Cargo Loading Platform.
Final Office Action dated Feb. 24, 2017 in U.S. Appl. No. 14/512,056.
Notice of Allowance dated Mar. 10, 2017 in U.S. Appl. No. 14/511,559.
Corrected Notice of Allowability dated Apr. 10, 2017 in U.S. Appl. No. 14/511,559.
Notice of Allowance dated Aug. 18, 2017 in U.S. Appl. No. 15/373,563.
Notice of Allowance dated Aug. 17, 2017 in U.S. Appl. No. 15/332,857.
Notice of Allowance dated Aug. 17, 2017 in U.S. Appl. No. 15/337,536.
Notice of Allowance dated Aug. 17, 2017 in U.S. Appl. No. 15/393,423.
Communication under Rule 71(3) EPC dated Mar. 30, 2017 in European Application No. 15181603.0.
Final Office Action dated Jul. 3, 2017 in U.S. Appl. No. 14/511,902.
Communication under Rule 71(3) EPC dated Jul. 21, 2017 in European Application No. 15189129.8.
Restriction Requirement dated Apr. 20, 2017 in U.S. Appl. No. 15/373,536.
Notice of Allowance dated May 16, 2017 in U.S. Appl. No. 14/512,056.
Himmelmann, U.S. Appl. No. 15/695,781, filed Sep. 5, 2017 and entitled Pressure Compensating Air Curtain for Air Cushion Supported Cargo Loading Platform.
European Patent Office, European Office action dated Mar. 6, 2018 in Application No. 16150150.7-1013.
Non-Final Office Action dated Feb. 26, 2018 in U.S. Appl. No. 15/695,781.
Advisory Action dated Oct. 6, 2017 in U.S. Appl. No. 14/511,902.
European Patent Office, European Office Action dated Mar. 12, 2018 in Application No. 15189124.9-1010.
European Patent Office, Intention to Grant dated Apr. 20, 2018 in European Application No. 15189145.4-1010.
USPTO, Notice of Allowance dated Apr. 26, 2018 in U.S. Appl. No. 15/695,781.
European Patent Office, Intention to Grant dated May 4, 2018 in European Application No. 15189127.2-1010.
State Intellectual Property Office of People's Republic China, Chinese Search Report dated Jun. 14, 2018 in Application No. 201610001504.4.
State Intellectual Property Office of People's Republic China, Chinese Office Action dated Jun. 27, 2018 in Application No. 201610001504.4.
USPTO, Notice of Allowance dated Nov. 15, 2018 in U.S. Appl. No. 14/511,902.
European Patent Office, Intent to Grant dated Jun. 13, 2018 in Application No. 15189116.5-101.
USPTO, Non-Final Office Action dated Jun. 26, 2018 in U.S. Appl. No. 14/511,902.
National Intellectual Property Administration, P. R. China, Second Office Action dated Mar. 11, 2019 in Application No. 201610001504.4.
USPTO, Corrected Notice of Allowance dated Dec. 6, 2018 in U.S. Appl. No. 14/511,902.

* cited by examiner

INTEGRATED MULTI-FUNCTION PROPULSION BELT FOR AIR CUSHION SUPPORTED AIRCRAFT CARGO LOADING ROBOT

FIELD

The present disclosure relates generally to cargo management systems.

BACKGROUND

Conventional aircraft cargo systems typically include various tracks and rollers that span the length of an aircraft. Power drive units ("PDUs") convey cargo forward and aft along the aircraft on conveyance rollers which are attached to the aircraft floor structure. Cargo may be loaded from an aft position on an aircraft and conducted by the cargo system to a forward position and/or, depending upon aircraft configuration, cargo may be loaded from a forward position on an aircraft and conducted by the cargo system to an aft position. Conventional systems are typically designed to accommodate a particular pallet size. Conventional systems are typically comprised of numerous components that may be time consuming to install, replace and maintain.

SUMMARY

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

In accordance with various embodiments, a multifunction belt is disclosed. The multifunction belt includes a plurality of cables. The plurality of cables includes at least one tension supporting cable configured to resist tension and a first signal conducting cable configured to conduct electricity. The multifunction belt also includes a coating applied to the plurality of cables.

Also disclosed herein is cargo management system. The cargo management system includes a cargo shuttle configured to receive cargo. The cargo management system also includes a multifunction belt coupled to the cargo shuttle. The multifunction belt includes a plurality of cables including at least one tension supporting cable configured to resist tension and a first signal conducting cable configured to conduct electricity. The multifunction belt also includes a coating applied to the plurality of cables. The cargo management system also includes a shuttle drive unit coupled to the multifunction belt and configured to apply tension to the multifunction belt.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option.

As used herein, "aft" refers to the direction associated with the tail of an aircraft, or generally, to the direction of exhaust of the gas turbine engine. As used herein, "forward" refers to the direction associated with the nose of an aircraft, or generally, to the direction of flight or motion.

Aircraft cargo management systems as disclosed herein allow cargo to be loaded into an aircraft and positioned within the aircraft in a simple, elegant manner. In that regard, aircraft cargo management systems as disclosed herein may reduce part count and associated replacement/wear costs over time.

Figure 1:
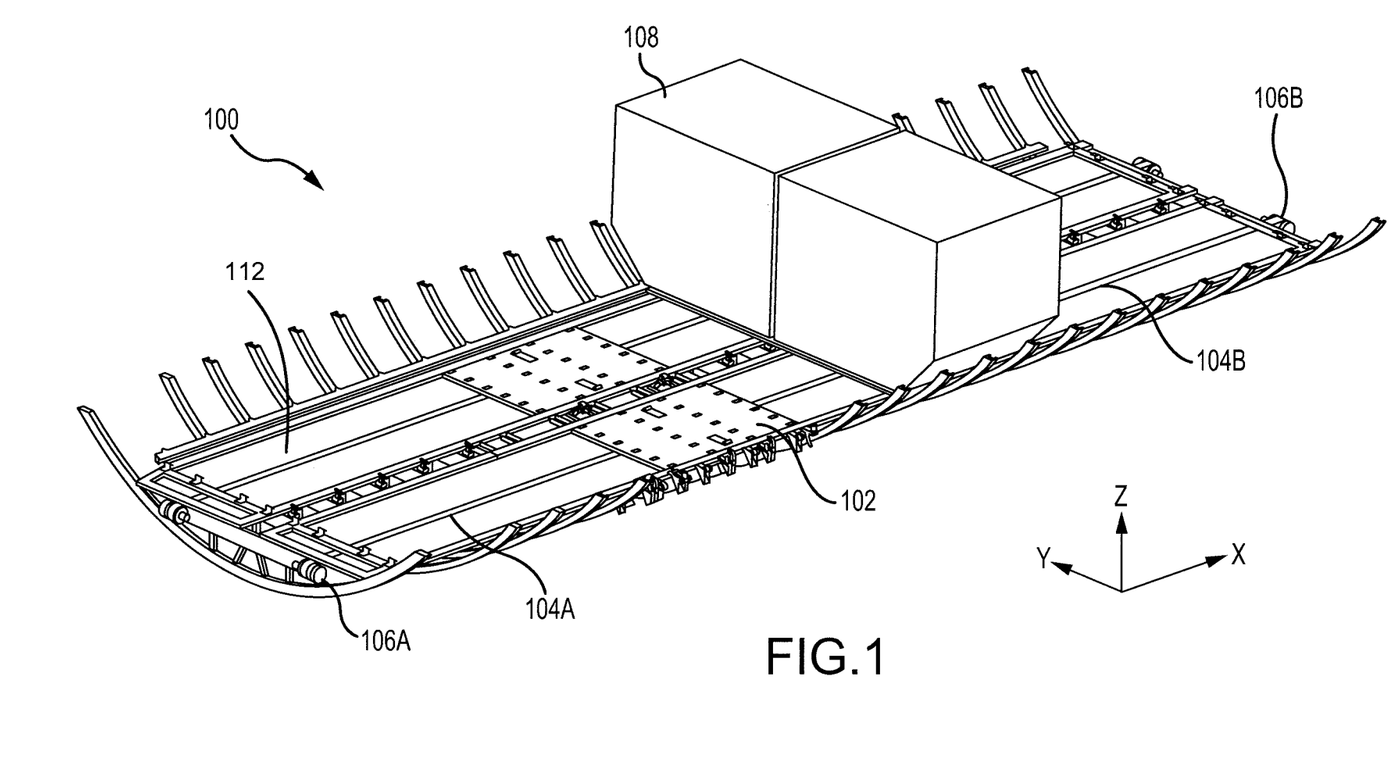
FIG. 1 illustrates an aircraft cargo system, in accordance with various embodiments.

With reference to FIG. 1, an aircraft cargo system 100 is illustrated. Throughout the FIGs., X-Y-Z axes are shown for ease of illustration. Cargo system 100 includes an aft shuttle drive unit 106A, a forward shuttle drive unit 106B, an aft multifunction belt 104A, a forward multifunction belt 104B, an air cushion cargo shuttle 102 and a floor panel 112.

Air cushion cargo shuttle 102 may include a controller and air blowers. The air blowers may be configured to direct a fluid, such as air, into a volume beneath air cushion cargo shuttle 102. The directed air may result in relatively high pressure (e.g., an air pressure higher than ambient air pressure) in the volume beneath air cushion cargo shuttle 102. This air pressure may cause air cushion cargo shuttle 102 to lift above floor panel 112 (i.e., displace air cushion cargo shuttle 102 in the positive Z direction). The controller of air cushion cargo shuttle 102 may be electrically and/or logically coupled with other devices. The controller may control an amount of air displaced via air blowers in order to alter the pressure beneath air cushion cargo shuttle 102, changing the distance that air cushion cargo shuttle 102 is lifted above floor panel 112.

Air cushion cargo shuttle 102 may be coupled to aft multifunction belt 104A and/or forward multifunction belt 104B. Tension may be applied to aft multifunction belt 104A and/or forward multifunction belt 104B. In response to sufficient tension applied to either multifunction belt, air cushion cargo shuttle 102 may be displaced forward and/or aft.

The multifunction belt may be wound around a portion of aft shuttle drive unit 106A or forward shuttle drive unit 106B. In that regard, a shuttle drive unit may comprise a cylindrical structure (e.g., a bobbin) to which a shuttle belt is affixed. The shuttle drive unit comprises a motive device, such as an electric motor, to rotate the bobbin in a desired direction. The shuttle drive unit may also disengage the electric motor or be otherwise geared in such a manner so that free rotation of the bobbin is allowed. Thus, as forward shuttle drive unit 106B may be rotating its bobbin to pull forward multifunction belt 104B forward, aft shuttle drive unit 106A may allow its bobbin to freely rotate in response to the force exerted by forward multifunction belt 104B through air cushion cargo shuttle 102. In like manner, as aft shuttle drive unit 106A may be rotating its bobbin to pull aft multifunction belt 104A aft, forward shuttle drive unit 106B may allow its bobbin to freely rotate or rotate in response to a low level of tension applied by aft multifunction belt 104A through air cushion cargo shuttle 102.

In order to reposition cargo 108 within cargo system 100, the air blowers of air cushion cargo shuttle 102 may displace a first amount of air, causing air cushion cargo shuttle 102 to lift above floor panel 112. In various embodiments, air cushion cargo shuttle 102 is not lifted above floor panel 112 prior to being positioned beneath cargo 108. While air cushion cargo shuttle 102 is being lifted by air blowers, forward shuttle drive unit 106B may become engaged and exert pressure on air cushion cargo shuttle 102 via tension applied to forward multifunction belt 104B. Air cushion cargo shuttle 102 may then be displaced forward such that it is positioned beneath cargo 108. In response to air cushion cargo shuttle 102 becoming positioned beneath cargo 108, force applied by forward shuttle drive unit 106B may be reduced and/or force may be applied via aft shuttle drive unit 106A causing air cushion cargo shuttle 102 to remain positioned beneath cargo 108.

While air cushion cargo shuttle 102 is positioned beneath cargo 108, the controller of air cushion cargo shuttle 102 may instruct the air blowers to increase the displacement of air beneath air cushion cargo shuttle 102, causing air cushion cargo shuttle 102 to lift further above floor panel 112, thus lifting cargo 108. When cargo 108 is lifted above floor panel 112, air cushion cargo shuttle 102 may be moved forward and/or aft based on tension applied to aft multifunction belt 104A and/or forward multifunction belt 104B without friction forces restricting the movement of air cushion cargo shuttle 102.

The air blowers, controller and/or other components of air cushion cargo shuttle may require power in order to operate. Similarly, the controller of air cushion cargo shuttle 102 may be in communication with a device remote from air cushion cargo shuttle. In order for air cushion cargo shuttle 102 to receive power and/or communication signals, aft multifunction belt 104A and/or forward multifunction belt 104B may be adapted to provide power and/or communications to air cushion cargo shuttle 102.

Figure 2:
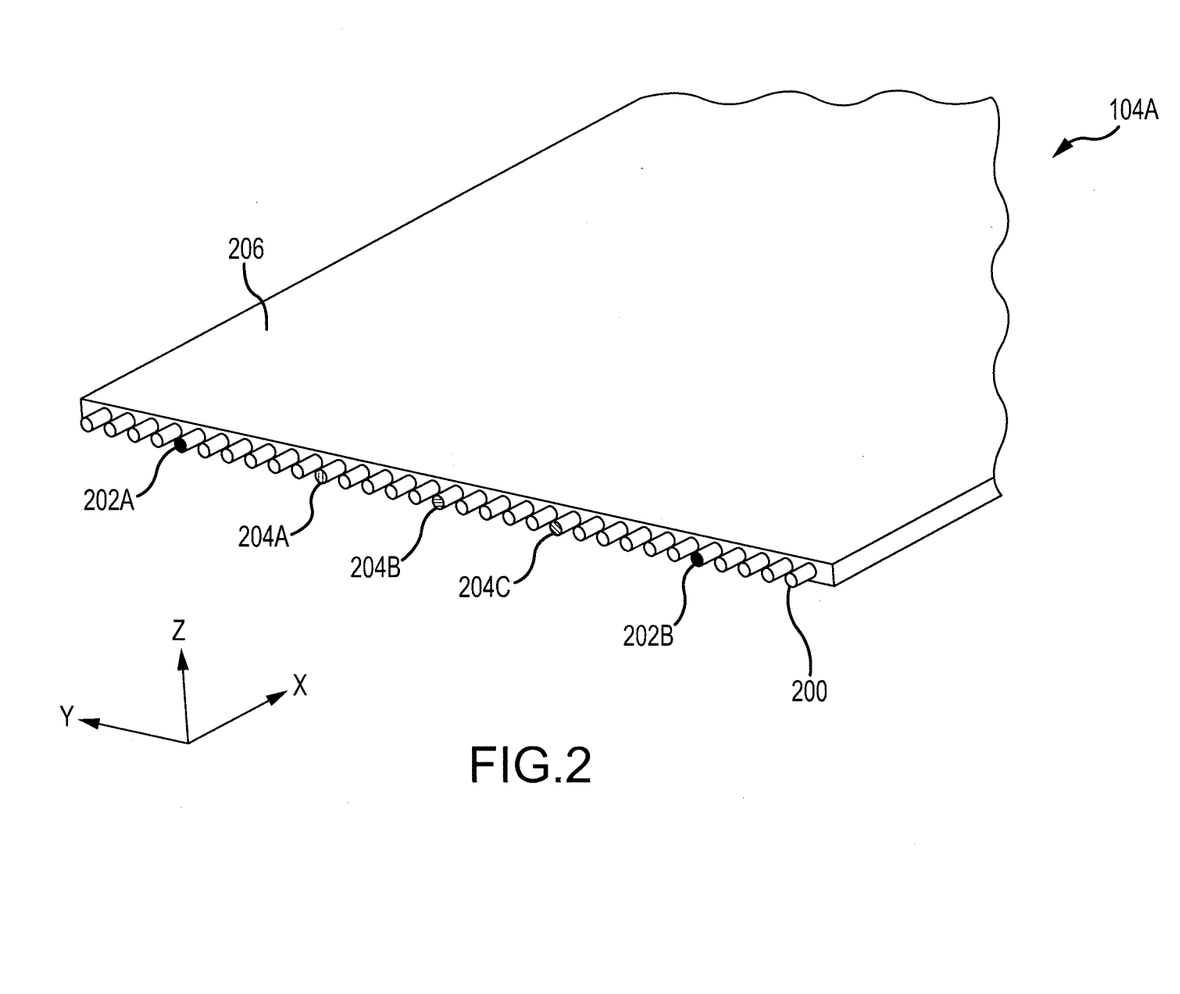
FIG. 2 illustrates an aft multifunction belt, in accordance with various embodiments.

FIG. 2 illustrates aft multifunction belt 104A in accordance with various embodiments. Aft multifunction belt 104A may be configured to operate in conjunction with various cargo shuttles including air cushion cargo shuttle 102.

Aft multifunction belt 104A may include a plurality of cables positioned adjacent each other in the Y direction. The plurality of cables include tension supporting cables 200, power conducting cables 202 and communication cables 204. The cables may be coated with a coating 206.

Aft multifunction belt 104 may be flat (i.e., when extended and resting, aft multifunction belt 104 has a length in the X direction, a width in the Y direction and a relatively small thickness in the Z direction). With brief reference back to FIG. 1, the flatness of aft multifunction belt 104A may provide benefits. Because aft multifunction belt 104A is flat, it may be proximate to floor panel 112 such that aft multifunction belt 104A may be positioned below cargo 108 while in tension. This prevents wear to aft multifunction belt 104A. Additionally, when aft shuttle drive unit 106 rotates its bobbin, aft multifunction belt 104A may require minimal space in the radial direction while wound around the bobbin of aft shuttle drive unit 106A.

In various embodiments, aft multifunction belt 104 may include a plurality of cables braided together such that aft multifunction belt 104 has a round cross-section, an oval cross-section or the like instead of a flat cross section.

Coating 206 may be made from a friction resistant polymer, such as polytetrafluoroethylene (PTFE) (available under the trademark Teflon™), natural and/or synthetic rubber, fiber reinforced PTFE, and other suitable materials. With reference to FIGS. 1 and 2, coating 206 may provide an anti-wear surface between the cables and surfaces of aft shuttle drive unit 106A. Coating 206 may also space the cables apart such that they are not in direct contact with each other, which may reduce the likelihood of power or communication signal degradation. Coating 206 may shield the cables from external magnetic and electric fields. Coating 206 may also cause the wires to remain in a relative position to each other in the Y direction (i.e., the width of aft multifunction belt 104A).

The plurality of cables of aft multifunction belt 104A may include tension supporting cables 200, power conducting cables 202 and communication cables 204. In various embodiments, aft multifunction belt 104A may include any number of tension supporting cables 200, power conducting cables 202 and/or communication cables 204. Power conducting cables 202 and communication cables 204 may be separated by tension supporting cables 200. In various embodiments, all power conducting cables 202 may be positioned adjacent each other, all tension supporting cables 200 may be positioned adjacent each other and/or all communication cables 204 may be positioned adjacent each other. In various embodiments, all power conducting cables 202 and all communication cables 204 may be positioned adjacent each other.

Tension supporting cables 200 may comprise a material with sufficient strength to minimize damage to them in response to being in tension. Tension supporting cables 200 may comprise, for example, steel, steel alloys, nylon fibers, a para-aramid synthetic fiber (available under the trademark Kevlar™), carbon fiber or the like. Tension supporting cables 200 may be adapted to resist a majority or all the tension applied to aft multifunction belt 104A via aft shuttle drive unit 106A and/or air cushion cargo shuttle 102. Accordingly, tension supporting cables 200 may support a majority or all force applied to air cushion cargo shuttle 102 via aft multifunction belt 104A.

Tension supporting cables 200 may be configured to resist over one hundred (100) pounds of force, over 500 pounds of force or over 1000 pounds of force. In various embodiments, tension supporting cables 200 may be between 10 gauge and 0000 gauge, between 7 gauge and 0000 gauge, or between 4 gauge and 0000 gauge.

Power conducting cables 202 may comprise a material, such as a metal, capable of conducting power to air cushion cargo shuttle 102. For example, power conducting cables 202 may comprise a metal, such as copper or a copper alloy, steel, aluminum, silver, gold, a conductive polymer or the like. Power conducting cables 202 may have the same or similar dimensions (i.e., gauge) as tension supporting cables 200. Power conducting cables 202A may be capable of transferring a large voltage to air cushion cargo shuttle 102 that is capable of powering components of air cushion cargo shuttle 102. Power signals propagated along power conducting cables 202 may be direct current power or alternating current power.

In various embodiments, power conducting cables 202 may be configured to conduct over 100 volts, over 500 volts or over 1000 volts and over 50 amperes, over 100 amperes or over 200 amperes. In various embodiments, power conducting cables 202 may be between 15 gauge and 0000 gauge, between 12 gauge and 0 gauge or between 10 gauge and 0 gauge.

Communication cables 204 may comprise a material suitable for propagation of an electrical signal. For example, communication cables 204 may comprise a metal, such as copper or a copper alloy, silver, gold, aluminum or the like. Communication cables 204 may also include a material, such as one or more glass threads, capable of supporting an optical signal, such as a fiber optic cable. Communication cables 204 may have the same or similar dimensions as power conducting cables 202 and/or tension supporting cables 200. Communication cables 204 may be capable of propagating a signal to and/or from air cushion cargo shuttle 102, and in particular, communication cables 204 may propagate signals directed to and received from the controller of air cushion cargo shuttle 102.

Communication cables 204, may include, for example, communication cable 204A, communication cable 204B, and/or communication cable 204C. Communication cables 204 may have a smaller gauge than power conducting cables 202 as communication cables 204 may not transport signals having voltages as high as power conducting cables 202. In various embodiments, communication cables 204 may be twisted groups of cables, such as category 5 (CAT5) cables, which are twisted pair cables. In various embodiments, communication cables 204 may be between 32 gauge and 10 gauge, between 27 gauge and 15 gauge or between 22 gauge and 18 gauge.

Communication cables 204 may be capable of propagating signals of any protocol. For example, aft multifunction belt 104 may include eight communication cables 204 such that communication cables 204 may propagate Ethernet physical layer signals (e.g., those using 10BASE-T, 100BASE-T, 1000BASE-T, etc), IEEE 1394 interface, Integrated Services for Digital Network (ISDN), and/or digital subscriber line, among others.

In various embodiments, aft multifunction belt 104A may include no tension supporting cables 200 such that power conducting cables 202 and communication cables 204 are braided in order to provide sufficient tension resistance and function as tension supporting cables.

Aft multifunction belt 104A is advantageous over any currently available belts or cables. Aft multifunction belt 104A is capable of resisting a force large enough to displace aircraft cargo, which may weigh up to 10,000 lbs and above. At the same time, aft multifunction belt 104A is capable of transmitting enough power to air cushion cargo shuttle 102 so that the air blowers can direct enough air beneath air cushion cargo shuttle 102 to lift cargo and/or transmitting communication signals to air cushion cargo shuttle. The flat design of aft multifunction belt 104A allows aft multifunction belt 104A to remain below cargo while in use so as not to degrade aft multifunction belt 104A or cargo via friction.

In various embodiments, every cable in aft multifunction belt 104A comprises the same material and same dimensions. A portion of the cables may be designated as power conducting cables and accordingly may be connected to a power signal, while some of the cables may be designated as communication cables and accordingly connected to a device capable of sending and/or receiving communication signals.

In various embodiments, communication cables 204 are not present in aft multifunction belt 104A, such that communication signals may be propagated along power conducting cables 202. In these instances, power signals and communication signals may propagate along the same cable or group of cables.

With reference to FIGS. 1 and 2, forward multifunction belt 104B may comprise the same components as aft multifunction belt 104A. In various embodiments, forward multifunction belt 104B may simply comprise tension supporting cables 200 such that air cushion cargo shuttle 102 receives all power and communications via aft multifunction belt 104A. In various embodiments, forward multifunction belt 104B may comprise power conducting cables and communication cables and aft multifunction belt 104A may comprise tension supporting cables 200, such that all power and communication signals are received by air cushion cargo shuttle 102 via forward multifunction belt 104B.

Figure 3:
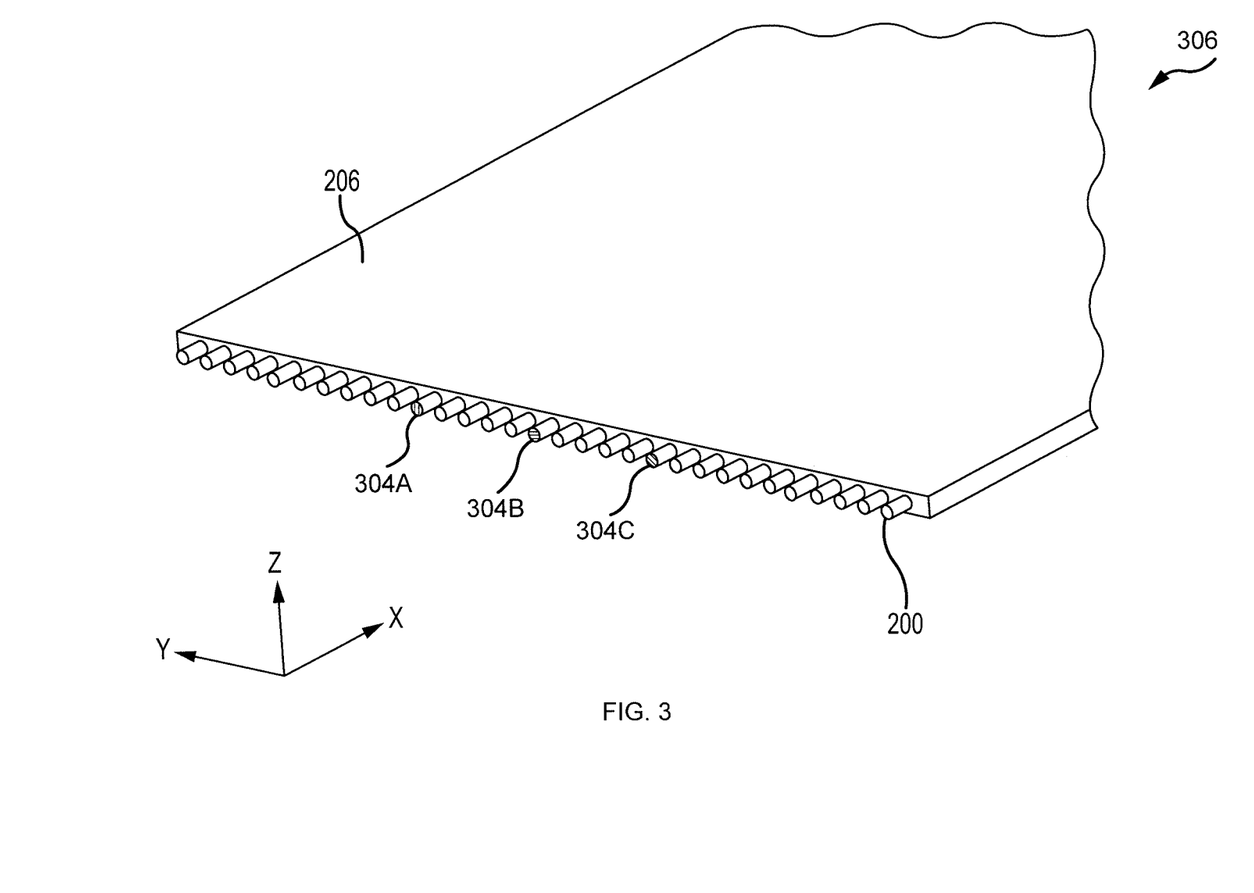
FIG. 3 illustrates another multifunction belt, in accordance with various embodiments.

FIG. 3 illustrates another multifunction belt 306, according to various embodiments. Multifunction belt 306 includes tension supporting cables 300 that are similar to tension supporting cables 200 and communication cables 304 that are similar to communication cables 204. Communication cables 304, may include, for example, communication cable 304A, communication cable 304B, and/or communication cable 304C. Multifunction belt 306 does not include power conducting cables.

Figure 4:
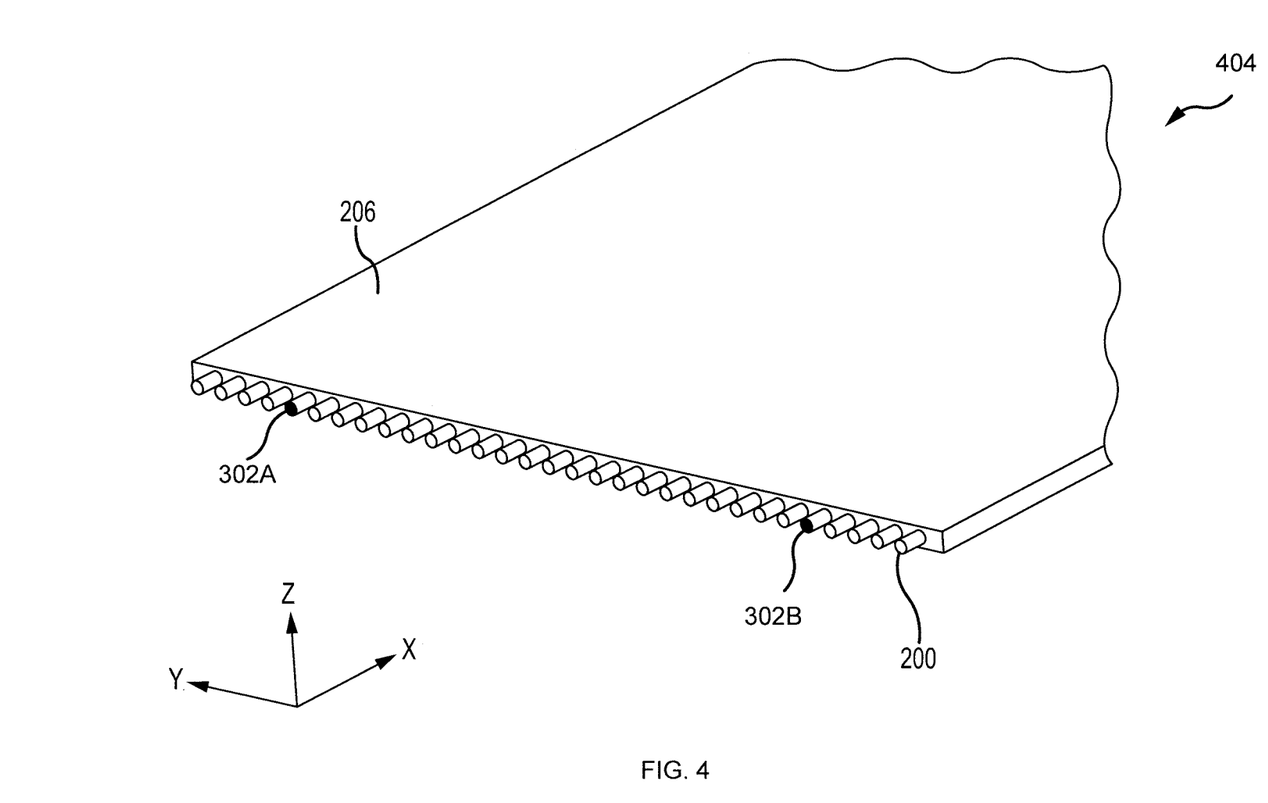
FIG. 4 illustrates another multifunction belt, in accordance with various embodiments.

FIG. 4 illustrates another multifunction belt 404 according to various embodiments. Multifunction belt 404 includes tension supporting cables 400 that are similar to tension supporting cables 200 and power conducting cables 302 that are similar to power conducting cables 202. With reference to FIGS. 1, 3 and 4, in various embodiments, aft multifunction belt 104A may comprise only communication cables, such as multifunction belt 306, or only power conducting cables 302A, such as multifunction belt 404. Forward multifunction belt 104B likewise may include only power conducting cables 302A, such as multifunction belt 404 or communication cables 304, such as multifunction belt 306. In these embodiments, one multifunction belt may provide communication signals and the other multifunction belt may provide power signals.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A multifunction belt comprising:
   a plurality of cables including:
      at least one communication cable,
      at least one power conducting cable,
      at least one tension supporting cable separating the at least one communication cable and the at least one power conducting cable; and
   a coating applied to the plurality of cables, wherein the multifunction belt is coupled to an aircraft cargo management system; and
   wherein the multifunction belt is coupled to an air cushion cargo shuttle.

2. The multifunction belt of claim 1, wherein the at least one communication cable comprises copper.

3. The multifunction belt of claim 1, wherein the at least one communication cable comprises one of a silver, gold, or aluminum material.

4. The multifunction belt of claim 1, wherein the coating comprises polytetrafluoroethylene.

5. The multifunction belt of claim 1, wherein the coating is configured to provide separation of each of the plurality of cables from each other.

6. The multifunction belt of claim 1, wherein the at least one communication cable has a smaller gauge than the at least one power conducting cable.

7. The multifunction belt of claim 1, wherein the at least one power conducting cable has the same gauge as the at least one tension supporting cable.

8. The multifunction belt of claim 1, wherein the at least one tension supporting cable comprises one of a steel, steel alloy, nylon fiber, para-aramid synthetic fiber, or carbon fiber material.

9. The multifunction belt of claim 1, wherein the at least one tension supporting cable is configured to resist over 100 pounds of force.

10. The multifunction belt of claim 1, wherein the multifunction belt is coupled to a forward shuttle drive unit and an aft shuttle drive unit.

11. A cargo management system comprising:
    a cargo shuttle configured to receive cargo;
    a multifunction belt coupled to the cargo shuttle and including:
       a plurality of cables including at least one communication cable configured to communicate, a power conducting cable configured to conduct electricity, and at least one tension supporting cable configured to separate the at least one communication cable and the at least one power conducting cable, and
       a coating applied to the plurality of cables; and
    a shuttle drive unit coupled to the multifunction belt and configured to apply tension to the multifunction belt.

12. The cargo management system of claim 11, wherein the multifunction belt is configured to receive tension and cause the cargo shuttle to be displaced in response to the multifunction belt receiving sufficient tension.

13. The cargo management system of claim 11, wherein the at least one power conducting cable comprises copper.

14. The cargo management system of claim 11, wherein the coating comprises polytetrafluoroethylene.

15. The cargo management system of claim 11, wherein the coating is configured to provide separation of each of the plurality of cables from each other.

16. The cargo management system of claim 11, wherein the at least one communication cable has a smaller gauge than the at least one power conducting cable.

17. The cargo management system of claim 8, wherein the at least one power conducting cable has the same gauge as the at least one tension supporting cable.

* * * * *